(12) United States Patent
Li et al.

(10) Patent No.: US 12,204,019 B2
(45) Date of Patent: Jan. 21, 2025

(54) SYSTEM AND METHOD THAT FACILITATES PRECISION LANDING OF AN AERIAL VEHICLE

(71) Applicant: The Boeing Company, Chicago, IL (US)

(72) Inventors: Rongsheng Li, Menifee, CA (US); Tim A. Murphy, Marysville, WA (US); Greg L. Sheffield, O'Fallon, MO (US)

(73) Assignee: The Boeing Company, Arlington, VA (US)

( * ) Notice: Subject to any disclaimer, the term of this patent is extended or adjusted under 35 U.S.C. 154(b) by 391 days.

(21) Appl. No.: 17/702,489

(22) Filed: Mar. 23, 2022

(65) Prior Publication Data
US 2023/0138527 A1 May 4, 2023

Related U.S. Application Data

(60) Provisional application No. 63/275,093, filed on Nov. 3, 2021.

(51) Int. Cl.
*G01S 13/91* (2006.01)
*G05D 1/00* (2006.01)
*G08G 5/02* (2006.01)
*G06F 1/12* (2006.01)

(52) U.S. Cl.
CPC .......... *G01S 13/913* (2013.01); *G05D 1/0669* (2013.01); *G08G 5/025* (2013.01); *G06F 1/12* (2013.01)

(58) Field of Classification Search
CPC ..... G05D 1/0669; G08G 5/025; G01S 13/913
See application file for complete search history.

(56) References Cited

U.S. PATENT DOCUMENTS

| | | | | |
|---|---|---|---|---|
| 4,429,312 | A | * 1/1984 | Chisholm | G01S 13/86 |
| | | | | 342/410 |
| 2020/0319330 | A1 | * 10/2020 | Bliss | H04W 4/02 |
| 2021/0063555 | A1 | * 3/2021 | Ertem | G01S 13/10 |
| 2021/0333352 | A1 | * 10/2021 | Thompson | G01S 5/0244 |

* cited by examiner

*Primary Examiner* — Marcus E Windrich
(74) *Attorney, Agent, or Firm* — Harrity & Harrity, LLP (57) ABSTRACT

A navigation, take-off, and landing support system (NTLS) that facilitates vertical landing at a landing area by an aerial vehicle comprises a plurality of pseudolites distributed proximate the landing area. Each pseudolite is configured to transmit a radio frequency (RF) signal that facilitates determining, by the aerial vehicle, its position and velocity relative to the pseudolite and whether the pseudolite is operating within a nominal operating range. A monitoring receiver is positioned proximate the landing area and is configured to receive RF signals from the pseudolites. A control system is in communication with the pseudolites and the monitoring receiver. The control system is configured to determine, based on the RF signals received from the monitoring receiver, whether the pseudolites are operating within a nominal operating range and to indicate to each of the pseudolites whether the pseudolite is operating within a nominal operating range.

20 Claims, 7 Drawing Sheets

SYSTEM AND METHOD THAT FACILITATES PRECISION LANDING OF AN AERIAL VEHICLE

RELATED APPLICATIONS

This application claims the benefit of priority under 35 U.S.C. § 119 (e) of U.S. Provisional Application No. 63/275,093, filed Nov. 3, 2021, the content of which is incorporated herein by reference in its entirety.

BACKGROUND

Field

This application generally relates to aircraft navigation systems. In particular, this application describes examples of systems and methods that facilitate the precision landing of an aerial vehicle.

Description of Related Art

Electric vertical take-off and landing (eVTOL) aircraft are being considered for use as air taxis to facilitate passenger travel between relatively close points of interest, such as between different parts of a large metropolitan area, geographically close cities, etc. Some examples of these aircraft include multiple counter-rotating rotors that are powered by one or more electric motors. Onboard batteries provide power to the electric motors. Some examples of these aircraft are equipped with GNSS receivers, which facilitate navigation. Some of these aircraft are intended to be operated by a pilot, while others are intended to be operated autonomously.

SUMMARY

In a first aspect, a navigation, take-off, and landing support system (NTLS) that facilitates vertical landing at a landing area by an aerial vehicle comprises a plurality of pseudolites distributed proximate the landing area, at least one monitoring receiver, and at least one control system. Each pseudolite is configured to transmit a radio frequency (RF) signal that facilitates determining, by the aerial vehicle and based on a code phase and a carrier phase of the RF signal, its position and velocity relative to the pseudolite and whether the pseudolite is operating within a nominal operating range. The monitoring receiver is positioned proximate the landing area and is configured to receive RF signals from the plurality of pseudolites, measure the code phase and the carrier phase associated with each of the plurality of pseudolites, and determine corresponding clock bias estimates associated with the RF signals of each pseudolite. The control system is in communication with the plurality of pseudolites and the monitoring receiver and is configured to determine, based on the RF signals received from the monitoring receiver, whether the plurality of pseudolites are operating within a nominal operating range and to indicate to each of the plurality of pseudolites whether the pseudolite is operating within a nominal operating range.

In a second aspect, a navigation method that facilitates vertical landing at a landing area by an aerial vehicle comprises communicating, by a plurality of pseudolites distributed proximate the landing area, a radio frequency (RF) signal that facilitates determining, by the aerial vehicle and based on a code phase and carrier phase of the RF signal, its position and velocity relative to the pseudolite. The method further comprises receiving, by at least one monitoring receiver positioned proximate the landing area, RF signals from the plurality of pseudolites, measuring, by the monitoring receiver, the code phase and the carrier phase associated with each of the plurality of pseudolites, and determining, by the monitoring receiver and based on the code phase and the carrier phase of the RF signal, corresponding clock bias estimates associated with the RF signals of each pseudolite. The method further comprises determining, by at least one control system in communication with the plurality of pseudolites and the at least one monitoring receiver and based on the RF signals received from the at least one monitoring receiver, whether the plurality of pseudolites are operating within a nominal operating range. The method further comprises communicating, by a bi-directional RF communication system in communication with the control system, landing area information associated with the landing area to the aerial vehicle. The landing area information indicates particular pseudolites of the plurality of pseudolites that are operating within a nominal operating range and the clock bias estimate, which further facilitates determining, by the aerial vehicle, its position and velocity relative to the pseudolites.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Various examples of systems, devices, and/or methods are described herein. Any embodiment, implementation, and/or feature described herein as being an example is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

As noted above, some electric vertical take-off and landing (eVTOL) aircraft are equipped with a GNSS receiver that facilitates navigation. However, such a navigation system does not provide the level of integrity, precision, and availability that is anticipated to be required by various regulatory agencies that regulate these activities. In particular, such navigation systems will not support, for example, vertical take-off/landing in dense urban areas where room for a landing area is limited. Landing in such areas is expected to require a horizontal and vertical position accuracy of 0.5 meters and 0.1 meters, respectively, with an expected failure probability of less than $10^{-9}$.

These and other issues are ameliorated by various navigation, take-off, and landing support system (NTLS) examples described herein. Some examples of the NTLS comprise several pseudolites (short for pseudo satellite) distributed proximate a landing area such as a landing area in a densely populated area. In an example, at least four pseudolites are provided to facilitate the triangulation of the aerial vehicle. Each pseudolite is configured to transmit a radio frequency (RF) signal that facilitates determining, by the aerial vehicle, a distance between the pseudolite and the aerial vehicle. Some examples of the NTLS include a monitoring receiver positioned proximate the landing area, and that is configured to receive the RF signals from the pseudolites. Some examples of the NTLS include a control system that is in communication with the pseudolites and the monitoring receiver. The control system is configured to determine, based on the RF signals received from the monitoring receiver, whether the pseudolites are operating within a nominal operating range.

Some examples of the NTLS include a number of pseudolites that is greater than the minimum number of pseudolites (e.g., four) needed to perform trilateration. For instance, an example of the NTLS includes ten pseudolites. The extra pseudolites facilitate improved location accuracy. Further, in the event that a particular pseudolite fails or otherwise begins to operate outside of a nominal operating range, it can be taken offline, and the number of remaining pseudolites is still sufficient to facilitate the performance of trilateration. In some examples, pseudolites that are operating outside of a nominal operating range are taken offline or instructed to broadcast an indication of the same (e.g., via the RF signals).

Some examples of the NTLS include additional and/or redundant monitoring receivers. In some examples, when the RF signals received by a majority of the monitoring receivers indicate that a particular pseudolite is in a particular state of operation (e.g., inoperative), the control system is configured to determine the particular pseudolite is in that particular state of operation. In some examples, when a particular monitoring receiver indicates a state of pseudolite operation that is different from the state of pseudolite operation indicated by the majority of monitoring receivers, the system is configured to determine that the monitoring receiver is operating outside of a nominal operating range.

Some examples of the NTLS include a primary control system, a redundant control system, a primary network, a redundant network, a primary power system, and a redundant power system. The primary and redundant networks facilitate communications between the control systems, pseudolites, and monitoring receivers. The primary and redundant power systems are configured to supply power to the networks, control systems, pseudolites, and monitoring receivers. In some examples, the primary control system and the redundant control system are configured to determine whether the primary network and/or the primary power system are inoperable and to utilize the redundant network for communications when the primary network is inoperable and to use the redundant power system to supply power when the primary power system is inoperable. In some examples, the redundant control system is configured to determine whether the primary control system is inoperable and to control operations of the NTLS when the primary control system is inoperable.

Some examples of the NTLS include a bi-directional RF communication system that is in communication with the control system. In some examples, the control system is configured to receive, via the bi-directional RF communication system, a landing request from the aerial vehicle. The control system then determines whether the aerial vehicle is authorized to land at the landing area and, if so, communicates an encryption key to the aerial vehicle that facilitates decoding, by the aerial vehicle, information in the RF signals.

Some examples of the control system are configured to communicate landing area information associated with the landing area to the aerial vehicle via the bi-directional RF communication system. Some examples of the control system communicate one or more waypoints to the aerial vehicle that facilitates navigating the aerial vehicle from a current location to the landing area. Some examples of the waypoints specify a location and a time at which the aerial vehicle 150 should arrive at the location specified by the waypoint.

Some examples of the landing area information indicate particular pseudolites of the NTLS that are operating within a nominal operating range. This, in turn, allows the aerial vehicle to base its location on RF signals received from the nominally operating pseudolites and to reject RF signals from those pseudolites that are operating outside of a nominal operating range. As noted above, some examples of pseudolites communicate their respective operational status in the RF signal and in some examples, the aerial vehicle determines the operational state of the pseudolites based on this information in the RF signal.

Figure 1A:
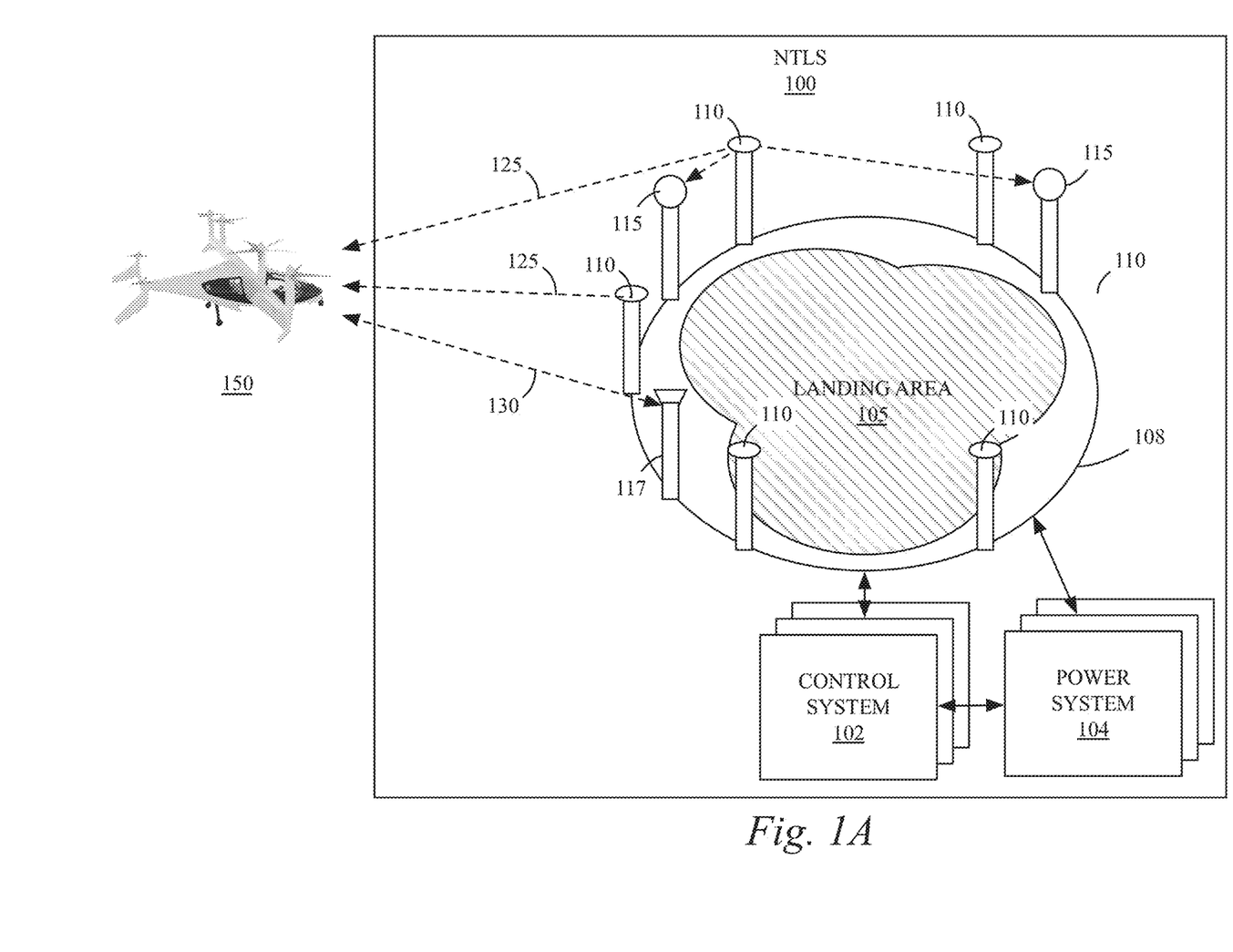
FIG. 1A illustrates a navigation, take-off, and landing support system (NTLS) that facilitates vertical landing at a landing area by an aerial vehicle, in accordance with example embodiments.

FIG. 1A illustrates an example of a navigation, take-off, and landing support system (NTLS) 100 that facilitates vertical landing at a landing area 105 by an aerial vehicle 150. The NTLS 100 includes a plurality of pseudolites 110, one or more monitoring receivers 115, and one or more control systems 102. Some examples of the NTLS 100 include a bi-directional RF communication system 117, one or more networks 108, and one or more power systems 104.

Some examples of the power systems 104 are configured to supply power to the various subsystems of the NTLS 100. Some examples of the power systems 104 receive power from a power utility and are configured to generate power in the case of utility power loss. In this regard, some examples of the power systems 104 comprise batteries or gas generators from which power is derived in the case of utility power loss. Some examples of the power systems 104 operate as redundant power systems 104 and are configured to supply power to the various subsystems of the NTLS 100 when one or more primary power systems 104 fail.

Some examples of the networks 108 facilitate communications between the various subsystems of the NTLS 100. Some examples of the networks 108 correspond to wireless, wired and/or fiber networks. Some examples of the networks 108 operate as redundant networks 108 and are configured to facilitate communications between the various subsystems of the NTLS 100 when one or more primary networks 108 fail.

Some examples of the pseudolites 110 are distributed proximate the landing area 105. For instance, some examples of the pseudolites 110 are distributed along the perimeter of the landing area 105. In this regard, some examples of the landing area 105 comprise one or more landing area regions that accommodate the simultaneous landing of a corresponding number of aerial vehicles 150.

Some examples of the pseudolites 110 are configured to transmit a radio frequency (RF) signal 125 that facilitates determining, by the aerial vehicle 150, a distance between the pseudolite 110 and the aerial vehicle 150. Some examples of the RF signal 125 comprise information that facilitates determining by the aerial vehicle 150 whether the pseudolite 110 is operating within a nominal operating range. Some examples of the aerial vehicles 150 utilize information from several pseudolites 110 (e.g., four or more) to precisely locate the landing area 105 or a particular landing area region within the landing area 105. In this regard, some examples of the aerial vehicle 150 perform trilateration based on the RF signals 125 to locate the landing area 105.

Some examples of the RF signal 125 comprise location data that specifies a location of a corresponding pseudolite 110. Some examples of the location data correspond to geospatial coordinates of the pseudolite 110. In this regard, in some examples, the location of each pseudolite 110 is precisely determined by surveying equipment and, in some cases, is accurate to within several centimeters.

Some examples of the RF signal 125 comprise integrity data that specifies whether the pseudolite 110 is operating within a nominal operating range. For instance, some examples of the RF signal 125 indicate whether the pseudolite 110 should be used for location determination, whether the pseudolite 110 is scheduled for maintenance, etc.

Some examples of the RF signal 125 comprise a pseudorandom code that facilitates deriving, by the aerial vehicle 150, a code-phase and a carrier-phase that facilitate measuring a distance between the aerial vehicle 150 and the particular pseudolite 110. In an example, the code-phase facilitates determining the location of the landing area 105 (or landing area region within the landing area 105) to within several meters of accuracy, and the carrier-phase facilitates refining this measurement to within centimeters of accuracy.

In some examples, the pseudorandom code associated with a group of pseudolites 110 distributed proximate a particular landing area 105 (e.g., a particular city or location in the city) is the same. In some examples, the pseudorandom code associated with a different group of pseudolites 110 distributed proximate a different landing area 105 (e.g., in a different city or different location of the city) is different from the pseudorandom code associated with the first group of pseudolites 110. In some examples, the RF signal 125 comprises a carrier wave that is in the gigahertz range (e.g., 1 GHZ, 2 GHZ, etc.)

Figure 1B:
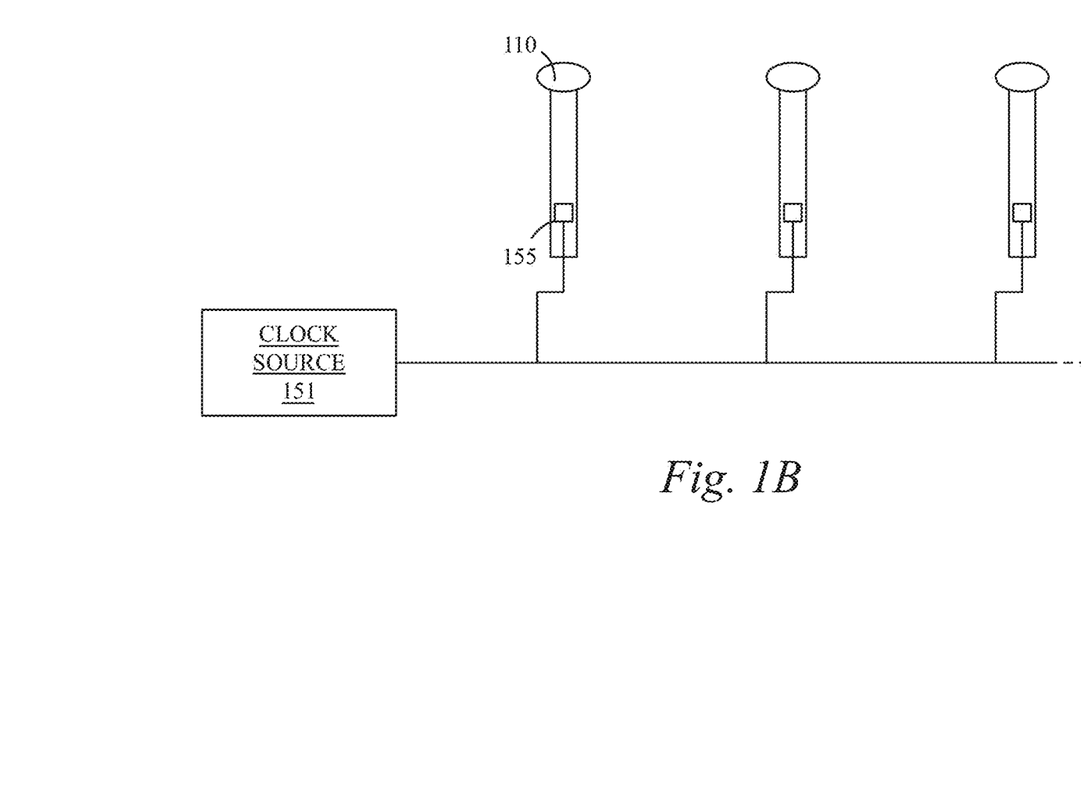
FIG. 1B illustrates a group of pseudolites of the NTLS, in accordance with example embodiments.

Referring to FIG. 1B, some examples of pseudolites 110 include a pseudorandom code generator 155 configured to generate the pseudorandom code specified in the RF signal. Some examples of the pseudorandom code generator 155 derive timing information from a common clock source 151 so that pseudorandom codes generated by each pseudolite 110 have the same phase and frequency. In this regard, in some examples, the common clock is communicated (e.g., via the network 108) to each pseudolite 110 from a particular monitoring receiver 115, a particular pseudolite 110 (e.g., master pseudolites), the control system 102, etc.

Some examples of the pseudorandom code generator 155 derive timing information from clock sources that are asynchronous. In this regard, some examples of the pseudolites 110 comprise a precision clock source (e.g., an atomic clock) that generates a clock signal. In some examples, the frequency and phase of the clock signal are calibrated from time to time (e.g., by the control system 102 and based on information received from the RF monitoring station 115) to minimize differences between respective frequencies and phases of the clock signals. Additionally, or alternatively, in some examples, timing information (e.g., relative differences in frequencies and phases) associated with the pseudorandom code of each pseudolite 110 is communicated to the aerial vehicle 150 to facilitate performing trilateration based on RF signals received from the pseudolites 110 that take into account this timing information.

Some examples of the monitoring receivers 115 are positioned proximate the landing area 105 and are configured to receive the RF signals 125 from the pseudolites 110. The monitoring receivers 115 are configured to receive the RF signals 125 from the pseudolites 110 to facilitate determining whether the pseudolites 110 are operating within a nominal operating range. For instance, in some examples, aspects of the RF signal 125 (e.g., carrier frequency, phase, pseudorandom code, etc.) are compared with expected values. In some examples, when values associated with these aspects for a particular pseudolite 110 deviate by a predetermined amount, the pseudolite 110 is determined to be operating outside of a nominal operating range. In this regard, some examples of the monitoring receivers 115 are configured to measure the code phase and the carrier phase associated with each of the plurality of pseudolites and determine, based on the code phase and the carrier phase of the RF signal, corresponding clock bias estimates associated with the RF signals of each pseudolite 110.

Some examples of the bi-directional RF communication system 117 implement a bi-directional communication channel 130 that facilitates transmitting information to the aerial vehicle 150, such as landing area 105 information associated with the state of equipment at the landing area 105 (e.g., the operational status of pseudolites 110 at the landing area 105). Some examples of the bi-directional RF communication system 117 are configured to facilitate processing a landing request communicated from an aerial vehicle 150 via the bi-directional communication channel 130.

Figure 2:
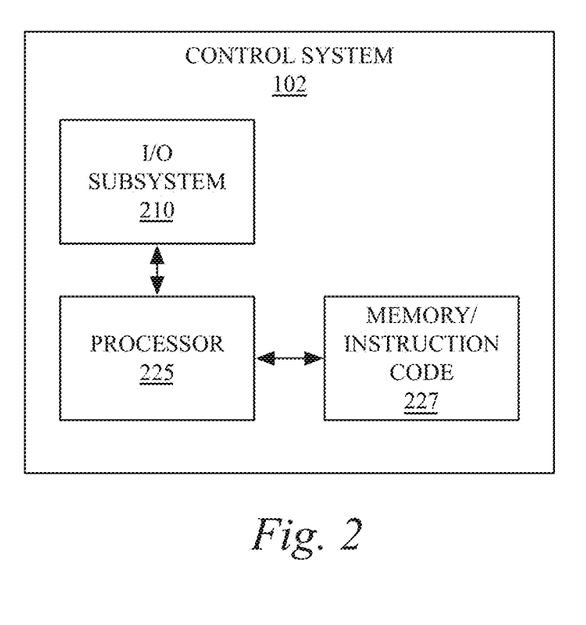
FIG. 2 illustrates an example of a control system.

FIG. 2 illustrates an example of a control system 102. The control system 102 includes a processor 225, a memory 227 in communication with the processor 225, and an input/output (I/O) subsystem 210.

The processor 225 is in communication with the memory 227. The processor 225 is configured to execute instruction code stored in the memory 227. The instruction code facilitates performing, by the control system 102, various operations that are described herein. In this regard, the instruction code may cause the processor 225 to control and coordinate various activities performed by the different subsystems of the control system 102 and/or the NTLS 100. Some examples of the processor 225 can correspond to a stand-alone computer system such as an ARM®, Intel®, AMD®, or PowerPC® based computer system or a different computer system and can include application-specific computer systems. The computer system can include an operating system, such as Windows®, Linux®, Unix®, or a different operating system.

Some examples of the I/O subsystem 210 include one or more input/output interfaces configured to facilitate communications with subsystems of the NTLS 100. An example of the I/O subsystem 210 includes wired or wireless communication circuitry configured to facilitate communicating information. An example of the wireless communication circuitry includes cellular telephone communication circuitry configured to communicate information over a cellular telephone network such as a 3G, 4G, and/or 5G network. Other examples of the wireless communication circuitry facilitate communication of information via an 802.11 based network, Bluetooth®, Zigbee®, near field communication technology or a different wireless network.

Figure 3:
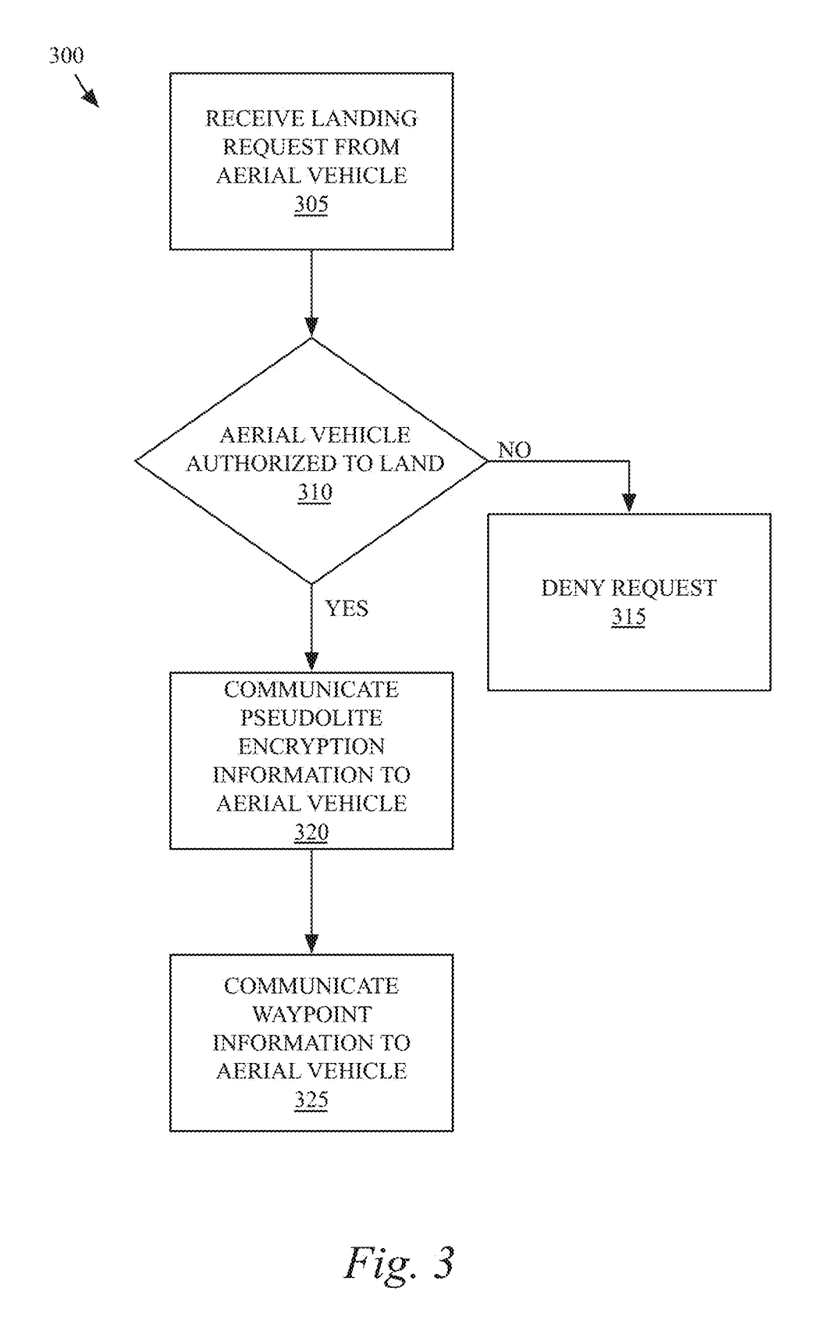
FIG. 3 illustrates operations that facilitate processing a landing request, in accordance with example embodiments.

FIG. 3 illustrates examples of operations 300 that facilitate processing the landing request received via the bi-directional communication channel 130. In some examples, these operations are performed by the control system 102, the bi-directional communication system 117, and/or both systems operating in cooperation with one another. The operations at block 305 involve receiving the landing request from the aerial vehicle 150. In this regard, in an example, the bi-directional communication system 117 broadcasts information associated with the landing area 105. Examples of this information facilitate the identification of the bi-directional communication channel 130 for receiving landing requests, information that specifies geospatial coordinates of the landing area 105 or different landing regions within the landing area 105, the operational status of the pseudolites 110 at the landing area 105, the weather conditions at the landing area 105, etc. In some examples, the aerial vehicle 150 communicates the landing request via the bi-directional communication channel 130 specified in the broadcast information.

The operations at block 310 involve determining whether the aerial vehicle 150 is authorized to land at the landing area 105. In some examples, the landing area 105 is restricted to particular aerial vehicles, pilots (if any), and/or passengers. In some examples, the landing request includes identifying information that identifies the aerial vehicle 150, pilot, and/or passengers and the control system 102 determines whether the aerial vehicle 150, pilot, and/or passengers are authorized to land at the landing area 105 based on the identifying information. In some examples, communication of the landing request triggers a series of communications (e.g., to conduct a financial transaction) that facilitate obtaining authorization to land at the landing area 105.

If, at block 310, the aerial vehicle 150 is not authorized to land, then the operations at block 315 are performed. These operations involve communicating information (e.g., via the bi-directional communication channel 130) to indicate to the aerial vehicle 150 that it is not authorized to land. In this case, additional information that would otherwise facilitate landing at the landing area 105 is not communicated to the aerial vehicle 150.

If, at block 315, the aerial vehicle 150 is authorized to land, then the operations at block 320 are performed. These operations involve communicating pseudolite 110 encryption key information (e.g., via the bi-directional communication channel 130) to the aerial vehicle 150. In some examples, the encryption key information specifies the pseudorandom code associated with the pseudolites 110 at the landing area 105. Communication of the pseudorandom code facilitates determining the code-phase and carrier-phase associated with the RF signals 125 communicated from the pseudolites 110. This, in turn, facilitates determining, by the aerial vehicle 150, its location relative to the locations of the pseudolites 110.

In some examples, the pseudorandom code used by the pseudolite 110 is changed periodically (e.g., once a day) to require periodic re-authorization to land at the landing area 105. Some examples of the pseudolites 110 output multiple RF signals 125, and each RF signal 125 is associated with a different pseudocode. This, in turn, facilitates the simultaneous authorization of several aerial vehicles 150 to land at the landing area 105 without sharing the pseudocode between the aerial vehicles 150.

The operations at block 325 involve communicating navigation information to the aerial vehicle 150 (e.g., via the bi-directional communication channel 130). In this regard, in some examples, the aerial vehicle 150 communicates its current location to the control system 102 (e.g., via the bi-directional communication channel 130), and the control system 102 determines a path (e.g., waypoints) the aerial vehicle 150 should follow that will guide the aerial vehicle 150 to the landing area 105. Some examples of the navigation information specify spatial coordinates (e.g., x, y, and z) for each waypoint and a time at which the aerial vehicle 150 should reach the waypoint or a speed at which the aerial vehicle 150 should travel to the waypoint. Some examples of the control system 102 take the flight paths of other aerial vehicles 150 into consideration in determining the waypoints.

Figure 4:
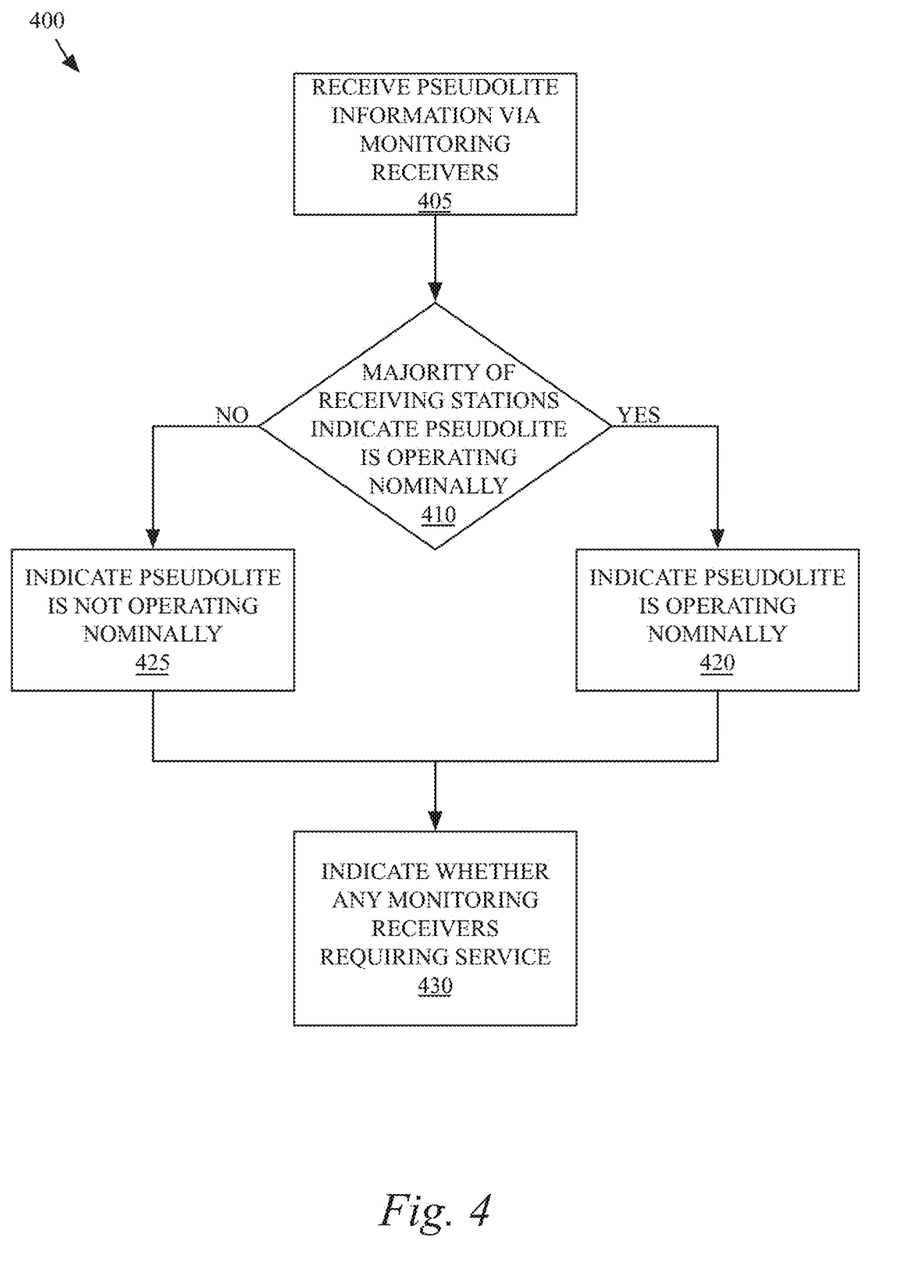
FIG. 4 illustrates operations that facilitate ensuring the integrity of information communicated by pseudolites, in accordance with example embodiments.

FIG. 4 illustrates examples of operations 400 that facilitate ensuring the integrity of information communicated by the pseudolites 110. As noted above, some examples of the NTLS 100 comprise redundant pseudolites 110 and redundant monitoring receivers 115. The operations at block 405 involve receiving pseudolite 110 information via one or more monitoring receivers 115. As noted above, each pseudolite 110 communicates an RF signal 125. Some examples of the RF signal 125 comprise a pseudorandom code that facilitates deriving, by the aerial vehicle 150, a code-phase and a carrier-phase that facilitates determining a distance between the aerial vehicle 150 and the pseudolite 110. In some examples, each monitoring receiver 115 determines the information within the RF signal 125 (e.g., the code-phase, carrier-phase, pseudorandom code, etc.) and communicates the information to the control system 102.

The operations at block 410 involve determining, based on the information communicated by the monitoring receivers 115, whether particular pseudolites 110 are operating within a nominal operating range. In some examples, when only one monitoring receiver 115 is used, the control system 102 compares the values in the information with predetermined values associated with a nominally operating pseudolite 110. When the values in the information are within a threshold range of the predetermined values, the pseudolite 110 is determined to be operating within a nominal operating range.

In some examples, when several monitoring receivers 115 are used, the values in the information from each monitoring receiver 115 are compared with the predetermined values, as described above. When the information provided by a majority of the receivers indicates that a particular pseudolite 110 is operating within a nominal operating range, the pseudolite 110 is determined to be operating within a nominal operating range. For example, the pseudolite 110 is determined to be operating within a nominal operating range when the information from two out of three monitoring receivers 115 indicates the pseudolite 110 is operating within a nominal operating range. The integrity of this determination is increased by increasing the number of monitoring receivers 115. For example, the integrity is increased when nine of ten monitoring receivers 115 indicate the pseudolite 110 is operating within a nominal operating range.

If at block 410, the pseudolite 110 is determined to be operating within a nominal operating range, then the operations at block 420 are performed. These operations involve indicating by the control system 102 that the pseudolite is operating within a nominal operating range. In some examples, this involves specifying within the RF signal 125 associated with the pseudolite that the pseudolite 110 is operating within a nominal operating range. Some examples of an aerial vehicle 150 monitor this aspect prior to using the pseudolite 110 for distance determinations. In some examples, the indication is specified via the bi-directional communication system 117. For example, the indication is specified in a broadcast communication or in a reply to the landing request referred to above.

If at block 410, the pseudolite 110 is determined to be operating outside of a nominal operating range, then the operations at block 425 are performed. These operations involve indicating by the control system 102 that the pseudolite 110 is operating outside of a nominal operating range. Following the examples above, the indication is specified within the RF signal 125 associated with the pseudolite 110, a broadcast communication by the bi-directional communication system 117, and/or in a reply to the landing request. In some examples, when the aerial vehicle 150 determines, based on the indication, that the pseudolite 110 is operating outside of a nominal operating range, the aerial vehicle 150 will not use the RF signal 125 from that pseudolite 110 for distance determinations.

The operations at block 430 involve indicating whether any monitoring receivers 115 require service. For instance, following the examples above, when the information provided by a majority of the receivers indicates that particular operating state of a pseudolite 110 (e.g., operating within a nominal operating range), but the information provided by a particular monitoring receiver 115 indicates a different state of operation (operating outside of a nominal operating range), that monitoring receiver 115 may be determined, by the control system 102, to be operating outside of a nominal operating range. In some examples, the monitoring receiver 115 may be indicated as such by the control system 102. In some examples, the control system 102 takes the monitoring receiver 115 offline and/or communicates a service request to a technician to service the monitoring receiver 115.

Figure 5:
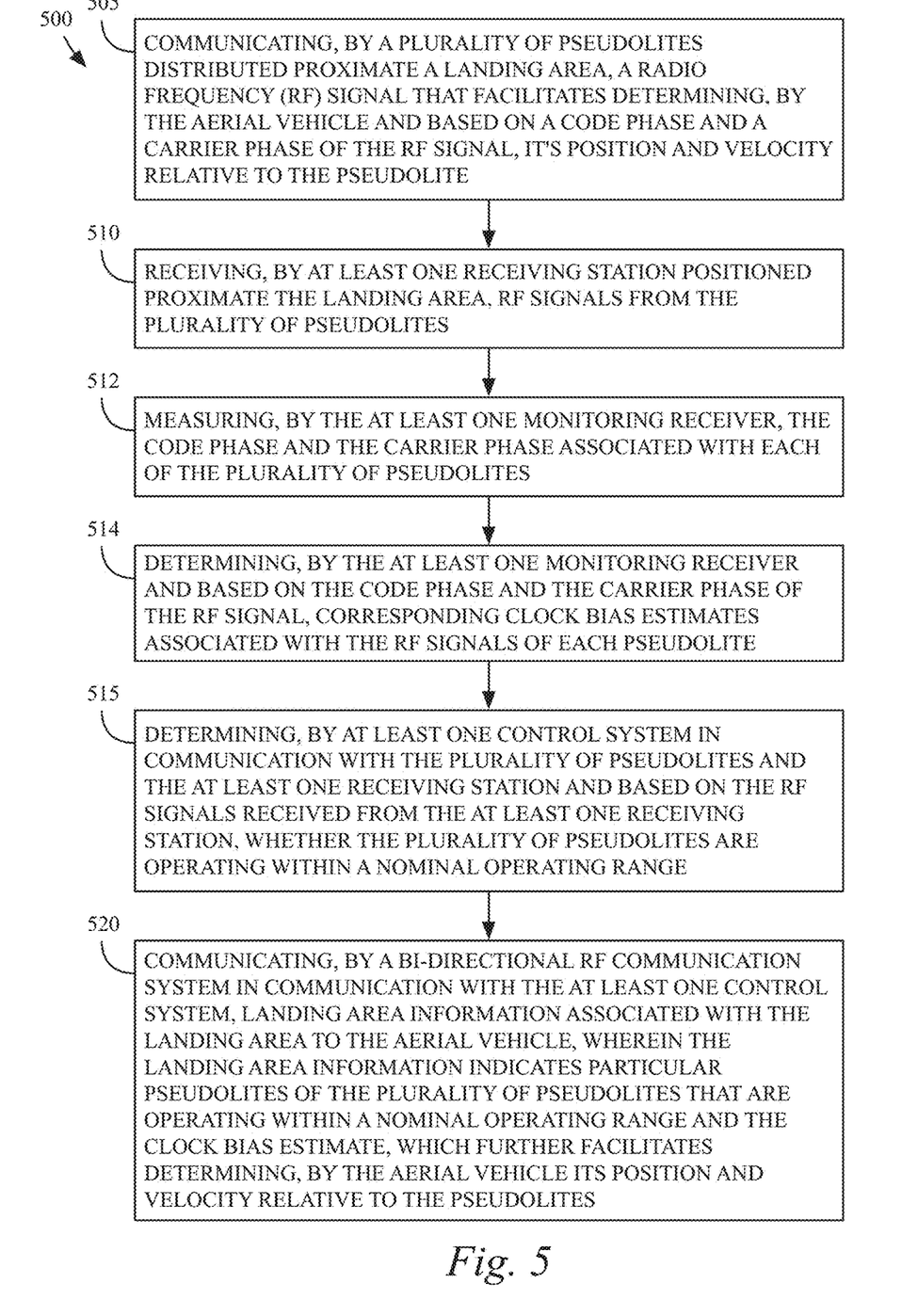
FIG. 5 illustrates operations performed by one or more devices described herein, in accordance with example embodiments.

FIG. 5 illustrates an example of operations 500 performed by some examples of the devices described herein. The operations at block 505 involve communicating, by a plurality of pseudolites 110 distributed proximate a landing area 105, a radio frequency (RF) signal that facilitates determining, by the aerial vehicle 150 and based on a code phase and a carrier phase of the RF signal, its position and velocity relative to the pseudolite 110.

The operations at block 510 involve receiving, by at least one monitoring receiver positioned proximate the landing area 105, RF signals from the plurality of pseudolites 110.

The operations at block 512 involve measuring, by the at least one monitoring receiver 115, the code phase and the carrier phase associated with each of the plurality of pseudolites 110.

The operations at block 514 involve determining, by the at least one monitoring receiver 115 and based on the code phase and the carrier phase of the RF signal, corresponding clock bias estimates associated with the RF signals of each pseudolite 110.

The operations at block 515 involve determining, by at least one control system 102 in communication with the plurality of pseudolites 110 and the at least one monitoring receiver and based on the RF signals received from the at least one monitoring receiver, whether the plurality of pseudolites 110 are operating within a nominal operating range.

The operations at block 520 involve communicating, by a bi-directional RF communication system in communication with the at least one control system 102, landing area 105 information associated with the landing area 105 to the aerial vehicle 150, wherein the landing area 105 information indicates particular pseudolites 110 of the plurality of pseudolites 110 that are operating within a nominal operating range and the clock bias estimate, which further facilitates determining, by the aerial vehicle 150 it's position and velocity relative to the pseudolites 110.

In some examples, the at least one monitoring receiver is one of a plurality of monitoring receivers 115 in communication with the at least one control system 102. These examples involve when the RF signals received by a majority of the plurality of the monitoring receivers 115 indicate that the particular pseudolite 110 is in a particular state of operation, determining, by the at least one control system 102, the particular pseudolite 110 is in the particular state of operation.

Some examples of the operations further involve when the RF signals received by the majority of the plurality of monitoring receivers 115 indicate that the particular pseudolite 110 is in a particular state of operation, and a particular monitoring receiver indicates that the particular pseudolite 110 is in a different state of operation, determining, by the at least one control system 102, the particular monitoring receiver to be operating outside of a nominal operating range.

Some examples of the operations further involve receiving, by the at least one control system 102 and via the bi-directional RF communication system, a landing request from the aerial vehicle 150, determining, by the at least one control system 102, whether the aerial vehicle 150 is authorized to land at the landing area 105, and responsive to determining that the aerial vehicle 150 is authorized to land at the landing area 105, communicating, by the at least one control system 102, an encryption key to the aerial vehicle 150 that facilitates decoding, by the aerial vehicle 150, information in the RF signals that facilitates determining, by the aerial vehicle 150, distances to the pseudolites 110.

In some examples, the landing request specifies a current location of the aerial vehicle 150. These examples further involve communicating, by the at least one control system 102 and to the aerial vehicle 150, one or more waypoints that facilitates navigating, by the aerial vehicle 150, the aerial vehicle 150 from the current location to the landing area 105.

In some examples, communicating, by the plurality of pseudolites 110, the RF signal involves communicating, by the plurality of pseudolites 110, an RF signal that comprises location data that specifies a location of the particular pseudolite, integrity data that specifies whether the pseudolite 110 is operating within a nominal operating range, and a pseudorandom code that facilitates deriving, by the aerial vehicle 150, a code-phase and a carrier-phase that facilitate measuring a distance between the aerial vehicle 150 and the particular pseudolite.

In some examples, each of the plurality of pseudolites comprises a pseudorandom code generator 155 configured to generate the pseudorandom code. These examples further involve deriving, by the pseudorandom code generator 155, timing information from a common clock source 151 of the NTLS.

In some examples, each of the plurality of pseudolites comprises a pseudorandom code generator 155 configured to generate the pseudorandom code. These examples further involve operating corresponding pseudorandom code generators 155 of the plurality of pseudolites asynchronously with respect to one another; and communicating, by the at least one control system, timing information associated with corresponding pseudorandom code generators 155 of the plurality of pseudolites to the aerial vehicle to facilitate performance of trilateration by the aerial vehicle.

Some examples of the operations involve adjusting, by the at least one control system, timing information associated with the pseudorandom code generators 155 to minimize differences between respective frequencies and phases of pseudorandom codes generated by the respective pseudorandom code generators 155.

In some examples, communicating, by the plurality of pseudolites 110 distributed proximate the landing area 105, the RF signal involves communicating an RF signal that indicates whether a corresponding pseudolite 110 is operating within a nominal operating range.

Figure 6:
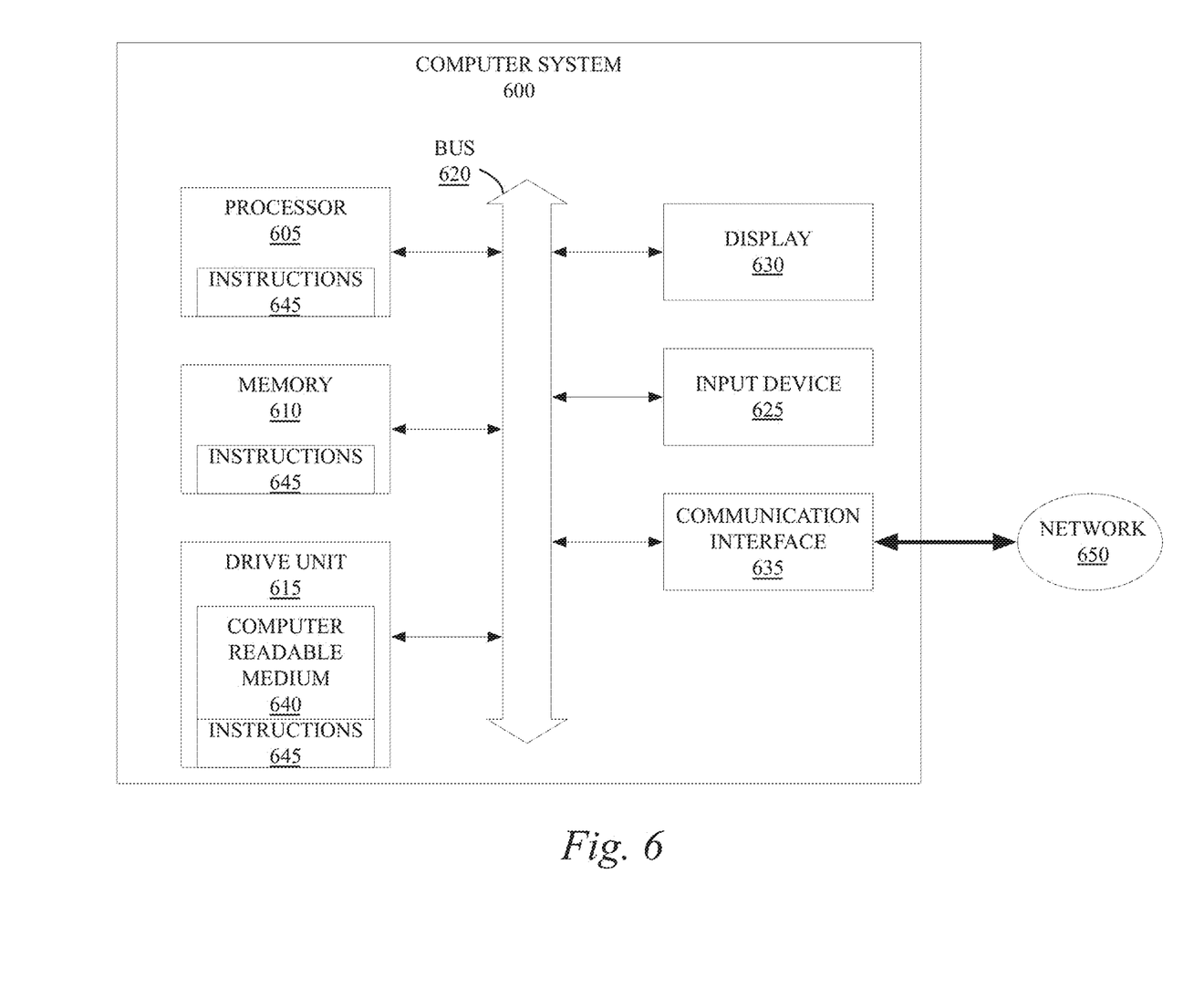
FIG. 6 illustrates a computer system, in accordance with example embodiments.

FIG. 6 illustrates an example of a computer system 600 that can form part of or implement any of the systems and/or devices described above. Some examples of the computer system 600 include a set of instructions 645 that the processor 605 can execute to cause the computer system 600 to perform any of the operations described above. Some examples of the computer system 600 operate as a standalone device or can be connected, e.g., using a network, to other computer systems or peripheral devices.

In a networked example, some examples of the computer system 600 operate in the capacity of a server or as a client computer in a server-client network environment, or as a peer computer system in a peer-to-peer (or distributed) environment. Some examples of the computer system 600 are implemented as or incorporated into various devices, such as a personal computer or a mobile device, capable of executing instructions 645 (sequential or otherwise), causing a device to perform one or more actions. Further, some examples of the systems described include a collection of subsystems that individually or jointly execute a set, or multiple sets, of instructions to perform one or more computer operations.

Some examples of the computer system 600 include one or more memory devices 610 communicatively coupled to a bus 620 for communicating information. In addition, in some examples, code operable to cause the computer system to perform operations described above is stored in the memory 610. Some examples of the memory 610 are random-access memory, read-only memory, programmable memory, hard disk drive, or any other type of memory or storage device.

Some examples of the computer system 600 include a display 630, such as a liquid crystal display (LCD), organic light-emitting diode (OLED) display, or any other display suitable for conveying information. Some examples of the display 630 act as an interface for the user to see processing results produced by processor 605.

Additionally, some examples of the computer system 600 include an input device 625, such as a keyboard or mouse or touchscreen, configured to allow a user to interact with components of system 600.

Some examples of the computer system 600 include a drive unit 615 (e.g., flash storage). Some examples of the drive unit 615 include a computer-readable medium 640 in which the instructions 645 can be stored. Some examples of the instructions 645 reside completely, or at least partially, within the memory 610 and/or within the processor 605 during execution by the computer system 600. Some examples of the memory 610 and the processor 605 include computer-readable media, as discussed above.

Some examples of the computer system 600 include a communication interface 635 to support communications via a network 650. Some examples of the network 650 include wired networks, wireless networks, or combinations thereof. Some examples of the communication interface 635 facilitate communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, some examples of the methods and systems described herein are realized in hardware, software, or a combination of hardware and software. Some examples of the methods and systems are realized in a centralized fashion in at least one computer system or in a distributed fashion where different elements are spread across interconnected computer systems. Any kind of computer system or other apparatus adapted for carrying out the methods described herein can be employed.

Some examples of the methods and systems described herein are embedded in a computer program product, which includes all the features that facilitate the implementation of the operations described herein and which, when loaded in a computer system, cause the computer system to perform these operations. A computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made, and equivalents can be substituted without departing from the scope of the claims. Therefore, it is intended that the present methods and systems are not limited to the particular examples disclosed but that the disclosed methods and systems include all embodiments falling within the scope of the appended claims.

The invention claimed is:

1. A navigation, take-off, and landing support system (NTLS) that facilitates vertical landing at a landing area by an aerial vehicle, the NTLS comprising:
a plurality of pseudolites distributed proximate the landing area, wherein each pseudolite is configured to transmit a radio frequency (RF) signal that facilitates determining, by the aerial vehicle and based on a code phase and a carrier phase of the RF signal, its position and velocity relative to the pseudolite and whether the pseudolite is operating within a nominal operating range;
at least one monitoring receiver positioned proximate the landing area and configured to receive RF signals from the plurality of pseudolites, measure the code phase and the carrier phase associated with each of the plurality of pseudolites, and determine corresponding clock bias estimates associated with the RF signals of each pseudolite; and
at least one control system in communication with the plurality of pseudolites and the at least one monitoring receiver, wherein the at least one control system is configured to determine, based on the RF signals received from the at least one monitoring receiver, whether the plurality of pseudolites are operating within a nominal operating range and to indicate to each of the plurality of pseudolites whether the pseudolite is operating within a nominal operating range.

2. The NTLS according to claim 1, wherein the at least one monitoring receiver is one of a plurality of monitoring receivers in communication with the at least one control system, wherein:
when the RF signals received by a majority of the plurality of the monitoring receivers indicate that a particular pseudolite is in a particular state of operation, the at least one control system is configured to determine the particular pseudolite is in the particular state of operation.

3. The NTLS according to claim 2, wherein when the RF signals received by the majority of the plurality of the monitoring receivers indicate that the particular pseudolite is in the particular state of operation, and a particular monitoring receiver indicates that the particular pseudolite is in a different state of operation, the at least one control system is configured to determine the particular monitoring receiver to be operating outside of a nominal operating range.

4. The NTLS according to claim 1, further comprising:
a bi-directional RF communication system in communication with the at least one control system and configured to communicate landing area information associated with the landing area to the aerial vehicle, wherein the landing area information indicates particular pseudolites of the plurality of pseudolites that are operating within a nominal operating range and the clock bias estimate, which further facilitates determining, by the aerial vehicle, its position and velocity relative to the pseudolites.

5. The NTLS according to claim 4, wherein the at least one control system is configured to:
receive, via the bi-directional RF communication system, a landing request from the aerial vehicle,
determine whether the aerial vehicle is authorized to land at the landing area, and
responsive to determining that the aerial vehicle is authorized to land at the landing area, communicate an encryption key to the aerial vehicle that facilitates decoding, by the aerial vehicle, information in the RF signals.

6. The NTLS according to claim 5, wherein the landing request specifies a current location of the aerial vehicle, wherein the at least one control system is further configured to:
communicate, to the aerial vehicle, one or more waypoints that facilitate navigating, by the aerial vehicle, the aerial vehicle from the current location to the landing area, wherein one or more of the waypoints specifies a location and a time at which the aerial vehicle should arrive at the location specified by the waypoint.

7. The NTLS according to claim 1, wherein the RF signal for a particular pseudolite comprises location data that specifies a location of the pseudolite, integrity data that specifies whether the pseudolite is operating within a nominal operating range, and a pseudorandom code that facilitates deriving, by the aerial vehicle, a code-phase and a carrier-phase that facilitate measuring a distance between the aerial vehicle and the particular pseudolite.

8. The NTLS according to claim 7, wherein each of the plurality of pseudolites comprises a pseudorandom code generator configured to generate the pseudorandom code, wherein each pseudorandom code generator of the plurality of pseudolites derives timing information from a common clock source of the NTLS.

9. The NTLS according to claim 7, wherein:
each of the plurality of pseudolites comprises a pseudorandom code generator, and corresponding pseudorandom code generators of the plurality of pseudolites are configured to operate asynchronously with respect to one another, and
the at least one control system is configured to communicate timing information associated with corresponding pseudorandom code generators of the plurality of pseudolites to the aerial vehicle to facilitate performance of trilateration by the aerial vehicle.

10. The NTLS according to claim 1, wherein the at least one control system comprises a primary control system and a redundant control system, wherein the NTLS further comprises:
a primary network and a redundant network that facilitate communications between the primary control system, the redundant control system, the plurality of pseudolites, and the monitoring receiver; and
a primary power system and a redundant power system configured to supply power to the primary network, the redundant network, the primary control system, the redundant control system, the plurality of pseudolites, and the monitoring receiver,
wherein the primary control system and the redundant control system are configured to determine whether the primary network or the primary power system are inoperable and to utilize the redundant network for communications when the primary network is inoperable and the redundant power system to supply power when the primary power system is inoperable, wherein the redundant control system is configured to determine whether the primary control system is inoperable and to control operations of the NTLS when the primary control system is inoperable.

11. A method that facilitates vertical landing at a landing area by an aerial vehicle, the method comprising:
communicating, by a plurality of pseudolites distributed proximate the landing area, a radio frequency (RF)

signal that facilitates determining, by the aerial vehicle and based on a code phase and a carrier phase of the RF signal, its position and velocity relative to the pseudolite;

receiving, by at least one monitoring receiver positioned proximate the landing area, RF signals from the plurality of pseudolites;

measuring, by the at least one monitoring receiver, the code phase and the carrier phase associated with each of the plurality of pseudolites;

determining, by the at least one monitoring receiver and based on the code phase and the carrier phase of the RF signal, corresponding clock bias estimates associated with the RF signals of each pseudolite;

determining, by at least one control system in communication with the plurality of pseudolites and the at least one monitoring receiver and based on the RF signals received from the at least one monitoring receiver, whether the plurality of pseudolites are operating within a nominal operating range; and communicating, by a bi-directional RF communication system in communication with the at least one control system, landing area information associated with the landing area to the aerial vehicle, wherein the landing area information indicates particular pseudolites of the plurality of pseudolites that are operating within a nominal operating range and the clock bias estimate, which further facilitates determining, by the aerial vehicle, its position and velocity relative to the pseudolites.

12. The method according to claim 11, wherein the at least one monitoring receiver is one of a plurality of monitoring receivers in communication with the at least one control system, wherein the method further comprises:

when the RF signals received by a majority of the plurality of the monitoring receivers indicate that a particular pseudolite is in a particular state of operation, determining, by the at least one control system, the pseudolite is in the particular state of operation.

13. The method according to claim 12, wherein the method further comprises:

when the RF signals received by the majority of the plurality of monitoring receivers indicate that the pseudolite is in a particular state of operation, and a particular monitoring receiver indicates that the pseudolite is in a different state of operation, determining, by the at least one control system, the monitoring receiver to be operating outside of a nominal operating range.

14. The method according to claim 13, wherein the method further comprises:

receiving, by the at least one control system and via the bi-directional RF communication system, a landing request from the aerial vehicle;

determining, by the at least one control system, whether the aerial vehicle is authorized to land at the landing area; and responsive to determining that the aerial vehicle is authorized to land at the landing area, communicating, by the at least one control system, an encryption key to the aerial vehicle that facilitates decoding, by the aerial vehicle, information in the RF signals that facilitates determining, by the aerial vehicle, distances to the pseudolites.

15. The method according to claim 14, wherein the landing request specifies a current location of the aerial vehicle, wherein the method further comprises:

communicating, by the at least one control system and to the aerial vehicle, one or more waypoints that facilitates navigating, by the aerial vehicle, the aerial vehicle from the current location to the landing area, wherein one or more of the waypoints specifies a location and a time at which the aerial vehicle should arrive at the location specified by the waypoint.

16. The method according to claim 11, wherein communicating, by the plurality of pseudolites, the RF signal comprises:

communicating, by the plurality of pseudolites, an RF signal that comprises location data that specifies a location of the particular pseudolite, integrity data that specifies whether the pseudolite is operating within a nominal operating range, and a pseudorandom code that facilitates deriving, by the aerial vehicle, a code-phase and a carrier-phase that facilitate measuring a distance between the aerial vehicle and the particular pseudolite.

17. The method according to claim 16, wherein each of the plurality of pseudolites comprises a pseudorandom code generator configured to generate the pseudorandom code, wherein the method further comprises:

deriving, by the pseudorandom code generator, timing information from a common clock source.

18. The method according to claim 16, wherein each of the plurality of pseudolites comprises a pseudorandom code generator configured to generate the pseudorandom code, wherein the method further comprises:

operating corresponding pseudorandom code generators of the plurality of pseudolites asynchronously with respect to one another; and communicating, by the at least one control system, timing information associated with corresponding pseudorandom code generators of the plurality of pseudolites to the aerial vehicle to facilitate performance of trilateration by the aerial vehicle.

19. The method according to claim 18, further comprising:

adjusting, by the at least one control system, timing information associated with the pseudorandom code generators to minimize differences between respective frequencies and phases of pseudorandom codes generated by the respective pseudorandom code generators.

20. The method according to claim 11, wherein communicating, by the plurality of pseudolites distributed proximate the landing area, the RF signal comprises:

communicating an RF signal that indicates whether a corresponding pseudolite is operating within a nominal operating range.

* * * * *